(No Model.) 2 Sheets—Sheet 2.
E. MICHON.
PLANTER.
No. 601,897. Patented Apr. 5, 1898.
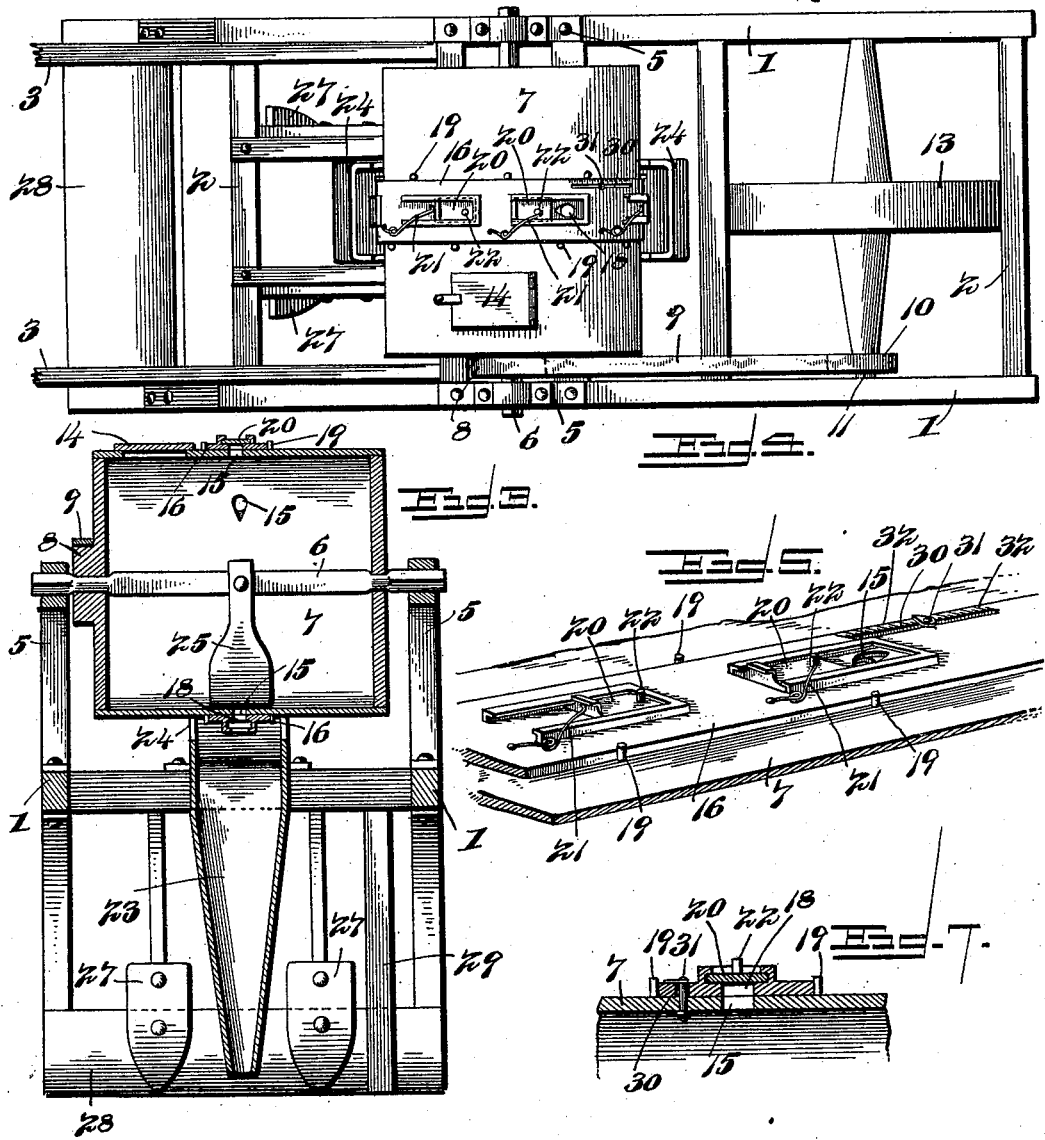
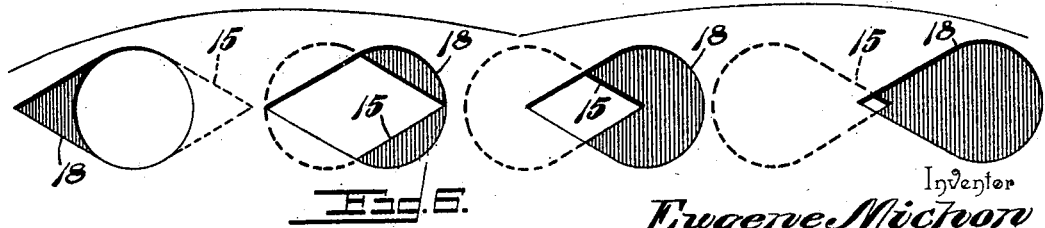
Witnesses
E. H. Stewart,
V. B. Hillyard.
Inventor
Eugene Michon
By C. A. Snow & Co. Attorneys,

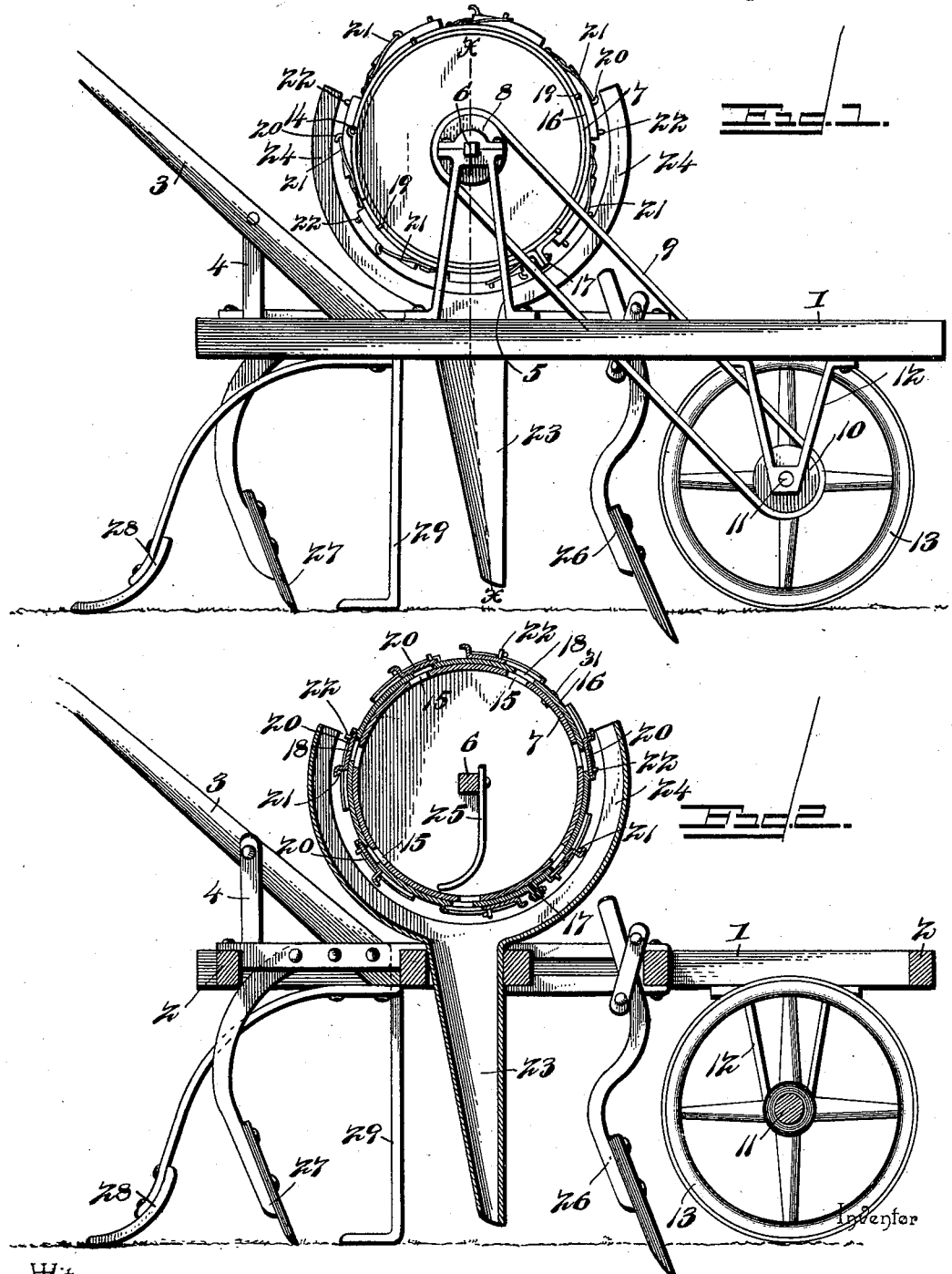

UNITED STATES PATENT OFFICE.

EUGENE MICHON, OF GRAND CHENIER, LOUISIANA.

PLANTER.

SPECIFICATION forming part of Letters Patent No. 601,897, dated April 5, 1898.

Application filed June 25, 1897. Serial No. 642,298. (No model.)

*To all whom it may concern:*

Be it known that I, EUGENE MICHON, a citizen of the United States, residing at Grand Chenier, in the parish of Cameron and State of Louisiana, have invented a new and useful Planter, of which the following is a specification.

This invention relates to planters in which the grain is located in a rotating hopper, drum, or barrel having a series of discharge-openings around its sides in the same plane and controlled by a band encircling the drum and movable thereon.

One of the principal features is to provide the band with a cut-off for each opening therein, so that in addition to regulating the size of the discharge-openings by moving the band any required opening or openings may be closed, according to the nature of the work in hand.

Another object is to have the openings in the drum and regulating-band of peculiar form, whereby their shape or relative contour changes with the size to suit the character of seed to be planted, which is of advantage to insure the proper distribution of the grain.

A further purpose of the invention is to improve the general construction, whereby the machine is capable of planting the seed deep or shallow, in drills or any distance apart, and whereby the seed is directed to the ground and prevented from being scattered by the wind and a positive feed insured, the parts being adjustable and readily detachable for any purpose desired.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and to a full disclosure of the invention an adaptation thereof is shown in the accompanying drawings, in which—

Figure 1 is a side elevation of a planter of special design, showing the application of the invention. Fig. 2 is a central longitudinal section. Fig. 3 is a transverse section on the line X X of Fig. 1, looking to the rear. Fig. 4 is a top plan view. Fig. 5 is a detail view of a portion of the band, showing an opening closed and an opening uncovered. Fig. 6 is a detail view showing some of the many forms of openings provided by moving the band upon the drum. Fig. 7 is a transverse section of a portion of the drum and band coöperating therewith.

Corresponding and like parts are referred to in the following description and indicated in the several views of the accompanying drawings by the same reference characters.

The planter-frame comprises longitudinal bars 1, end bars 2, and intermediate cross-bars, all firmly attached at their meeting ends. Handles 3 are secured to the longitudinal bars and are strengthened by braces 4. Brackets 5 are attached at their lower ends to the longitudinal bars 1 and support a transverse rod or bar 6, upon which is rotatably mounted the drum, cylinder, or barrel 7, which is provided at one end with a pulley 8, by means of which motion is imparted to the drum by means of a drive-belt 9, passing around the pulley 8 and a corresponding pulley 10 on the axle 11, journaled in hangers 12 and provided with a ground-wheel 13.

The drum 7 is in the form of a cylinder and is provided in its side with a door 14, through which the seed to be planted is introduced into the drum, said door being held shut by suitable fastening means. A series of discharge-openings 15 are provided around the drum midway of its ends and are circumferentially elongated, being round at one end and pointed at the opposite end, for a purpose presently to be explained. The number of the discharge-openings 15 will depend upon the capacity of the planter and will vary to meet any requirement. A band 16, mounted upon the drum and having its end portions bent and secured together by a fastening 17, has a number of openings corresponding in position with the discharge-openings 15 and of like form, said openings 18 extending inversely to the openings 15, whereby a turning of the band upon the drum will bring the openings 15 and 18 more or less into register, whereby any desired shape from a perfectly round opening to a square opening may be secured, as indicated in Fig. 6. The band is prevented from lateral displacement by studs 19, projecting from the drum and engaging with the edges thereof, said studs being applied to the drum in any desired manner. A cut-off 20 is had for each opening 18 and operates in suitable guides which direct it in its movements and insure the correct positioning thereof. A spring 21 is secured at one end to the band 16, and its opposite end is adapted to engage with the cut-off to hold it either closed or open, as required. Each cut-off has a knob or projection 22, which is engaged by the spring 21 to hold it open when required. The band 16 is turned upon the drum to regulate the size of the discharge-openings and secure the desired shape, according to the form of the seed to be planted, and if it be not required to have all of the discharge-openings uncovered those not required are closed by the cut-offs in the manner set forth, and any number from one to the full number of discharge-openings may be brought into operation by a proper manipulation of the cut-offs, as will be readily understood.

The grain-spout 23 is located immediately below the drum, and guards 24 extend from the upper end thereof upon each side of the drum and have their edges inwardly flanged to provide a space to receive any grain and direct the same into the spout. These guards 24 fit closely against the opposite sides of the drum and prevent the wind from scattering the seed should any escape through the higher discharge-openings. Some seed, as cotton, is of a nature to require a force-feeder to insure its proper distribution, and to meet this requirement the rod or bar 6 has a force-feeder 25 secured thereto and consisting of a stem having its lower portion widened and curved slightly and located in the plane of the discharge-openings, so as to insure a delivery of the seed therethrough as the drum rotates upon the transverse rod or bar 6 in the operation of the planter.

The opener 26 is vertically adjustable to regulate the depth of the planting and may be of any desired form. The coverers 27 are located in the rear of the grain-spout to close the furrow or trench provided by the opener and covering the seed dropped therein. The leveler or smoothing-bar 28 operates in the rear of the coverers and is secured to the longitudinal bars 1 by spring-arms, so as to yield to enable the leveler to ride over clods or objects which cannot be broken or pulverized by the part 28. When required, shovels of desired form will be secured to the longitudinal bars, either in advance of the coverers or in the rear thereof, to assist materially in preparing the land to secure the best possible results. A marker 29 is secured to one of the cross-bars, and its lower end trails upon the ground and indicates the position of the row, so that the seed may be planted in straight lines and at any required distance apart, the marker enabling the operator to determine the spacing.

If it be desired to provide round openings, the band 16 is turned upon the drum so as to bring the rounded ends of the openings 15 and 18 into opposite relation, and if square or diamond-shaped openings are required the band is moved so as to bring the tapering ends of the said openings into opposite relation, and by moving the band to an intermediate point any desired size and shape of the opening may be secured, as indicated in Fig. 6 and as will be readily understood. The band 16 is provided at one edge with a slot 30 and is held in the located position by a fastening 31, projecting from the drum and operating in the said slot. A series of graduations 32 are located at one side of the slot 30 and in conjunction with the fastening 31 or other mark determine the nature and size of the discharge-openings without reference to the said openings, the operator after a little practice being enabled to secure the required size and form of openings by means of the graduations 32 and the indicating-mark cooperating therewith.

Having thus described the invention, what is claimed as new is—

1. In a planter, the combination of a drum provided with a series of discharge-openings, a band encircling the drum and having a longitudinal slot and graduations at one side of the slot, and provided with openings corresponding with the said discharge-openings and a fastening projecting from the drum and operating in the longitudinal slot of the band and serving to retain the latter in a located position and to act jointly with the graduations to properly position the band with respect to the drum to secure the required size and form of discharge-openings, substantially as set forth.

2. In a planter, the combination of a rotatable drum having a series of discharge-openings, a band encircling the drum and provided with a corresponding series of openings, and adjustable to vary the size of the openings, and a cut-off for each opening of the band applied directly thereto and movable therewith, substantially as set forth.

3. In a planter, the combination of a drum having a series of openings around its circumference, a band encircling the drum and having a corresponding series of openings, a cut-off for each opening of the band, and a spring for each cut-off to hold it either open or closed, substantially in the manner set forth for the purpose described.

4. In a planter, the combination of a drum having a discharge-opening, a cut-off for the said opening having a projection, and a spring disposed to engage with the projection to hold the cut-off open and to bear against the latter and hold it closed, substantially as set forth.

5. In a planter, the combination of a drum having a series of openings around its circumference, a band encircling the drum and having a corresponding series of openings, means for adjusting the band to vary the size of the openings and securing it when positioned, a cut-off for each opening of the band, and means for holding the cut-offs either open or closed, substantially as set forth.

In testimony that I claim the foregoing as my own I have hereto affixed my signature in the presence of two witnesses.

EUGENE MICHON.

Witnesses:
THOMAS DELANEY,
C. B. JONES.